United States Patent [19]
Kizu et al.

[11] 3,930,420
[45] Jan. 6, 1976

[54] STEERING WHEEL ASSEMBLY

[75] Inventors: Ryouhei Kizu, Toyota; Masahiro Harada, Ichinomiya; Teruo Kobayasi, Inuyama, all of Japan

[73] Assignees: Toyota Jidosha Kogyo Kabushiki Kaisha; Toyoda Gosei Co., Ltd., both of Japan

[22] Filed: Oct. 4, 1974

[21] Appl. No.: 511,930

[30] Foreign Application Priority Data
Oct. 8, 1973 Japan............................. 48-112276

[52] U.S. Cl.................................. 74/552; 74/558.5
[51] Int. Cl.²........................................ B62D 1/04
[58] Field of Search.................... 74/552, 492, 558.5

[56] References Cited
UNITED STATES PATENTS

| | | | |
|---|---|---|---|
| 3,364,785 | 1/1968 | Geller | 74/552 |
| 3,528,314 | 9/1970 | Barenyi | 74/552 |

*Primary Examiner*—Samuel Scott
*Assistant Examiner*—F. D. Shoemaker
*Attorney, Agent, or Firm*—Lane, Aitken, Dunner & Ziems

[57] ABSTRACT

A steering wheel assembly in which a hub is mounted at one end of a steering shaft and is connected to a rim by a plurality of spokes. A cover is mounted over the spokes and is formed by a base layer and a coated surface layer of a resilient material. The free end of a bent portion of the cover is disposed adjacent to an outer edge portion of the hub.

10 Claims, 5 Drawing Figures

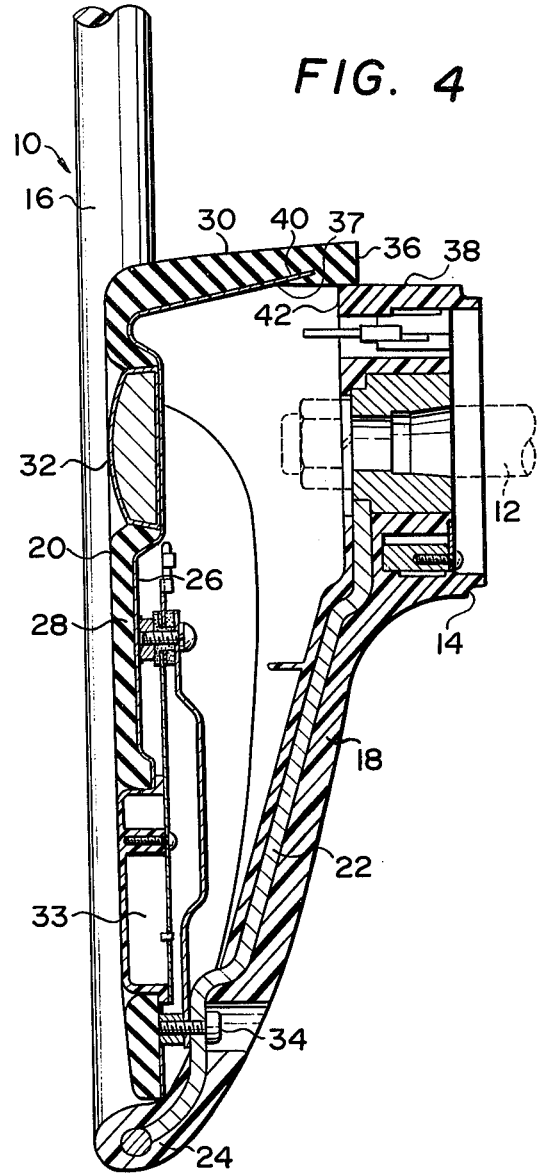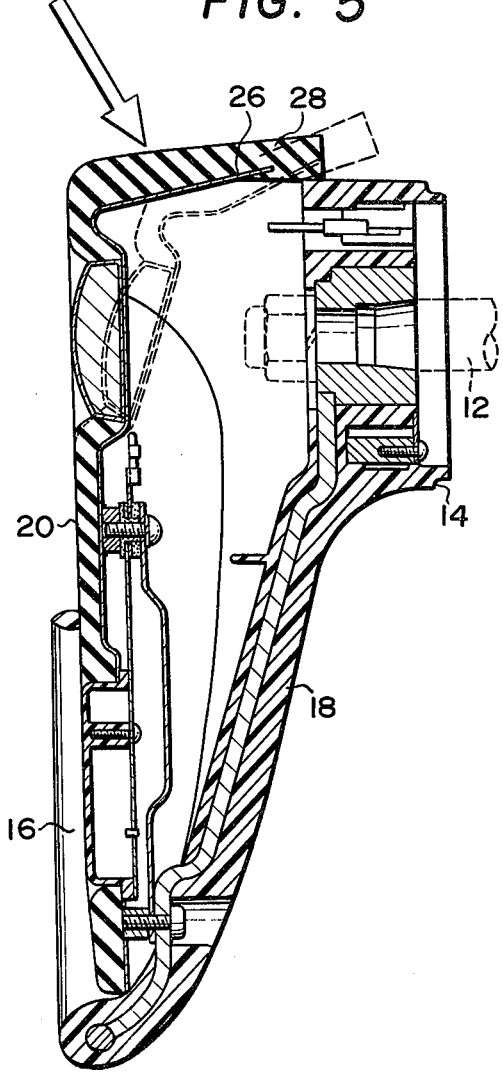

STEERING WHEEL ASSEMBLY

BACKGROUND OF THE INVENTION

This invention generally relates to safety devices for vehicle drivers, and more particularly to a steering wheel having means for protecting a driver from shocks or impacts which would otherwise be imposed on the head of the driver during an accident such as vehicle collision.

Where a steering wheel of a shock absorbing construction is used in combination with a three-point restraining seat belt system for the purpose of protecting a vehicle driver against impacts or shocks as would occur as a result of a vehicle collision or other dangerous accidents, the body of the driver is retrained in the seated position by the seat belt system at the time of, for example, collision, while the head of the driver is turned around at the neck portion and thrown violently against the hub or spokes of the steering wheel. The turned head of the driver undergoes a sudden deceleration when hit upon the steering wheel and receives a serious damage as a consequence.

More particularly, the prior art steering wheels with a shock absorbing construction invariably contemplate to protect drivers against possible damages by means of a resilient material which is provided on the steering wheel to give cushioning effects and to act as a shock absorber at the time of vehicle collision. However, it has been found that sufficient shock absorption cannot be expected with the cushioning action of the resilient material alone and the driver's head still undergoes a sudden deceleration as a result of crashing on the hub or spoke of the steering wheel.

SUMMARY OF THE INVENTION

It is therefore an object of the instant invention to provide an improved steering wheel construction which is capable of preventing a driver's head from a sudden deceleration at the time of collision for protecting the driver's head from the damages which would otherwise be imposed thereon when crashed upon the steering wheel.

It is another object of the invention to provide an improved steering wheel construction employing a resilient means which is adapted to undergo plastic deformation when a driver's head is crashed thereon for absorbing the impact energy through deformation to reduce the deceleration to which the driver's head might be subjected.

According to the present invention, there is provided a steering wheel construction, comprising a hub mounted at one end of a steering shaft, a rim, a number of spokes connecting the hub to the rim, a cover member having a base layer and a coated surface layer of a resilient material and provided with a bent portion having a free end disposed adjacent to an outer edge portion of the hub, the bent portion of the cover means being adapted to undergo plastic deformation when a driver's head is crashed thereon for the purpose of absorbing impact energy.

BRIEF DESCRIPTION OF THE DRAWINGS

The above and other objects, features and advantages of the invention will become clear from the following description and the appended claims, when taken in conjunction with the accompanying drawings which show by way of example preferred embodiments of the invention and wherein:

FIG. 4 is a sectional view taken along line 4 — 4 of FIG. 1; and

FIG. 5 is a view similar to FIG. 4 but showing a spoke cover as deformed as a result of collision of the vehicle.

DESCRIPTION OF PREFERRED EMBODIMENTS

Figure 1:
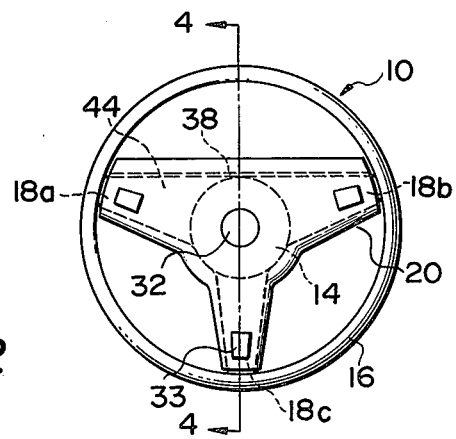
FIG. 1 is a plan view showing the steering wheel construction according to the invention.
Figure 2:
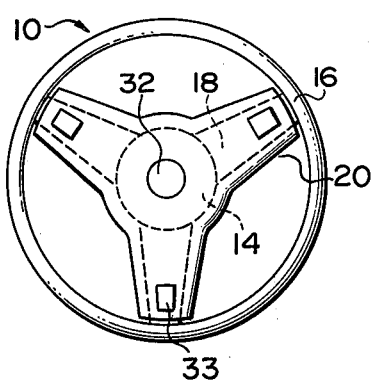
FIG. 2 is a plan view showing another embodiment of the present invention.
Figure 3:
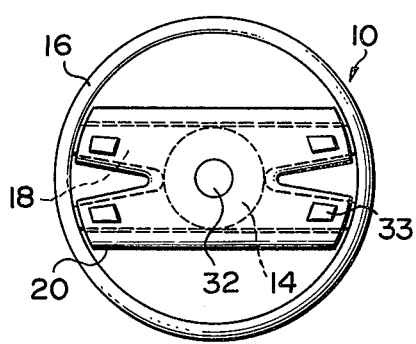
FIG. 3 is a plan view showing still another embodiment of the present invention.

Referring to FIG. 1, the steering wheel generally indicated at 10 includes a hub 14 mounted at one end of a steering shaft 12 (FIGS. 4 and 5); a rim 16; a number spokes 18 (18a, 18b, 18c and so on) arranged generally in T-shape to connect the hub 14 to the rim 16; and cover means 20 mounted over the spokes 18. The hub 14, rim 16 and spokes 18 are formed into an integral structure by means of a resin material which are reinforced by interconnected iron cores 22 and 24. The spokes connecting the hub 14 to the rim 16 can be arranged in various other ways different from the particular example shown in FIG. 1. For instance, in the embodiment shown in FIG. 2, the hub 14 and rim 16 are connected to each other by means of three spokes which are arranged generally in Y-shape and covered by cover means 20. While, in the embodiment shown in FIG. 3, the hub 14 and rim 16 are connected by means of four spokes 18 which are arranged generally in H-shape and covered similarly by cover means 20.

As shown particularly in FIG. 1, the cover means 20 has a generally T-shape for covering all of the three spokes 18. The cover means 20 comprises a base layer or core 26 of metal and a coated surface layer 28 of a resilient material such as soft foams, as shown in FIG. 4. Furthermore, the cover means 20, when seen on the section line 4 — 4 of FIG. 1 or on other section lines parallel thereto, has a generally L-shaped cross-section with a substantially straight portion extending in parallel to the rim 16, and a bent portion 30 as seen in FIG. 4. The cover means 20 includes in the straight portion a recess 32 for fitting therein a decorative mark and a recess 33 for mounting a horn mechanism.

The lower end of the straight portion of the cover 20 is fixed to the spoke 18 by means of a screw 34 through the connection between the core members 26 and 22. The bent portion 30 of the cover means 20 has a free end 36 at which the underlayer 26 has a bent portion 37 which has its digital end spaced with a gap of about 10 mm from an outer edge portion 38 of the hub 14. At the bent portion 30 of the cover 20, the core 26 is extended into the coated surface layer 28 at a certain angle with respect to the bent portion 37 mentioned above. Before the deformation to which the cover member 20 is subjected upon application of impacts as will be discussed hereinlater, that is to say, in the state shown in the drawings, the core 26 has its end 40 disposed short of the edge 42 of the hub 14. In the embodiments shown, the outer edge portions 44 of the spokes 18a and 18b are held in the same relation as the hub 14 with respect to the bent portion 30 of the cover means 20, and the bent portion 37 of the core member 26 is disposed on the outer edge portion 44 of the spokes.

Upon collision, the body of the driver is held in the seated position by mean of the three-point restraining seat belt system as mentioned hereinbefore, and the driver's head is turned at his neck and violently thrown in a forward direction, more particularly, in the direction indicated by an arrow in FIG. 5, against the cover means 20. Upon the driver's head hitting against the cover member 20, the energy of movement of the head is converted into energy of deformation of the base layer 26 and the coated surface layer 28 and the cover member 20 is ultimately deformed as shown by a broken line in FIG. 5. When the cover member 20 is deformed, the coated surface layer 28 of a resilient material serves to absorb the impact energy through deformation and at the same time to disperse the localized surface pressure caused by contact with the driver's head.

By the deformation of the cover means 20, the end portion 40 of the base layer 26 is brought into engagement with the hub 14, however, it will not be interfered by the rim 16 due to the provision of a sufficient gap space between the hub and the cover means, angular disposition of the bent portion 30 and its position relative to the hub 14. Therefore, the cover means 20 is deformed efficiently and sufficiently without interference by the rim 16 for the absorption of the impact energy imposed thereon by the driver's head.

In this manner, with an increased stroke of plastic deformation of the cover means 20 which receives an impact from the driver's head, the energy of movement of the head is reduced to a significant degree before it is hit upon the hard structure of the hub 14, so that the driver's head is protected against the serious damage which would otherwise be caused thereto when hit upon the hub 14. It will thus be understood that the steering wheel construction can ensure higher safety for the vehicle drivers.

While there have been described and shown preferred embodiments of the present invention, it is understood that the same is not limited thereto but is susceptible to many changes and modifications within the spirit and scope thereof and, therefore, it is not intended to be limited to the details shown and described herein nor to any particular type of vehicle steering wheel but is intended to cover all such changes and modifications as are encompassed by the scope of the invention as defined in the appended claims.

What is claimed is:

1. A steering wheel construction, comprising in combination:
   a hub mounted at one end of a steering shaft;
   a rim;
   a plural number of spokes connecting said hub to said rim; and
   cover means having a base layer and a coated surface layer of a resilient material and mounted over said spokes;
   said cover means being provided with a bent portion having a free end disposed in the proximity of an outer edge portion of said hub.

2. A steering wheel construction as defined in claim 1, wherein said spokes are three in number and are arranged generally in T-shape.

3. A steering wheel construction as defined in claim 1, wherein said spokes are three in number and are arranged generally in Y-shape.

4. A steering wheel construction as defined in claim 1, wherein said spokes are four in number and are arranged generally in H-shape.

5. A steering wheel construction as defined in claim 1, wherein said hub, rim and spokes are formed into an integral structure by means of a synthetic resin material reinforced by iron cores which are connected to each other.

6. A steering wheel construction as defined in claim 1, wherein said cover means comprises a base layer formed of metal; and a coated surface layer of a resilient material including soft foams.

7. A steering wheel construction as defined in claim 1, wherein said cover means is generally in L-shape including a portion extending in parallel to said rim and a bent portion.

8. A steering wheel construction as defined in claim 7, wherein said parallel portion of said cover means has the end thereof fixed between core members by means of a screw.

9. A steering wheel construction as defined in claim 7, wherein said bent portion of said cover means terminates in a free end and said base layer in said bent portion is spaced by a predetermined distance from said outer edge portion of said hub at said free end.

10. A steering wheel construction as defined in claim 9, wherein said base layer is extended into said coated surface layer at an angle with respect to the base layer in said bent portion.

* * * * *